WEB TRANSPORT DRIVING AND BRAKING MECHANISM

Filed April 22, 1968

INVENTOR.
STEN R. GERFAST
BY Kinney, Alexander, Sell, Steldt & DeLaHunt
ATTORNEYS United States Patent Office 3,495,789
Patented Feb. 17, 1970

3,495,789

WEB TRANSPORT DRIVING AND BRAKING MECHANISM

Sten R. Gerfast, St. Paul, Minn., assignor to Minnesota Mining and Manufacturing Company, St. Paul, Minn., a corporation of Delaware Filed Apr. 22, 1968, Ser. No. 722,935
Int. Cl. G11b *15/32*
U.S. Cl. 242—201 6 Claims

ABSTRACT OF THE DISCLOSURE

A web transport driving and braking system comprising a reversibly driven shaft with a helix thereon, a disc threadably mounted on the helix, and two independent rotatably mounted wheels spaced axially relative to the helix. Each wheel has a surface frictionally engageable with the disc. When the reversibly driven shaft and helix rotates in one direction, frictional engagement between one wheel and the disc occurs for driving said one wheel. Rotation of the helix in the opposite direction or stopping the helix causes frictional engagement between the other wheel and the disc for driving or braking said other wheel. When rotation of the helix is stopped the inertia of the disc will move it axially by rotation about the helix from its driving engagement with one of the wheels to a braking engagement with the other wheel.

BACKGROUND OF THE INVENTION

This invention relates to a web transport drive and braking system and in one aspect to a novel system for alternately driving and for alternately driving and braking a pair of shafts such as reel supporting spindles in magnetic tape recorders.

There are presently in use many tape recorder reel drive and braking systems which provide a means for regulating tape movement such that the tape may be run at a substantially constant speed, reversed, wound at increased speed or stopped. In providing a means for so regulating tape movement, various problems have been encountered. For example, when stopping tape movement the momentum of the unwinding reel often causes "spillage" of the tape and a loop of loose tape results unless the unwinding reel is stopped before the winding or takeup reel. This "spillage" may cause breakage of the tape when restarting the apparatus because the tape will be subjected to increased tension at the moment slack is eliminated.

If the tape is not maintained under a definite degree of tension during its movement past the recorder head, "slack" may occur in the tape which may create variations in tape speed past the recording gap, and hence result in undesirable variations either in the recorded data or the quality of reproduction.

In coping with the problems of regulating tape movement, the systems which have been devised are either excessively complex, bulky, expensive or unreliable. For example, in U.S. Patent 2,962,239, issued to Loewe et al., Nov. 29, 1960, a reel braking system is disclosed in which brake shoes are secured to the armatures of two electromagnetic coils and positioned so that upon actuating the electromagnetic coils, the brake shoes frictionally engage each of the winding and unwinding reels. The braking of the winding and unwinding reels is carried out at different times with different braking forces in order to prevent spillage of tape between the two reels, the unwinding reel being braked prior to the winding reel. The invention of Loewe et al. provides only a means for braking the reels; a further separate means is necessary for driving the reels.

Many systems have utilized a separate motor for each reel and a separate braking device in order to accomplish the desired driving and braking control of the reels, as illustrated, for example, by Schober, U.S. Patent 3,208,-681, issued Sept. 28, 1965, and U.S. Patent 3,294,333, issued to Sanford, Dec. 27, 1966. Such systems result in expensive, complex, and bulky mechanisms which are undesirable for use in present day, compact player-recorders.

Matovich, U.S. Patent 3,090,573, issued May 21, 1963, discloses a tape reel drive system which utilizes a single electric motor, two drive pulleys, four gears, two one-way clutches and two slip clutches to drive and brake a pair of reels. The present invention provides a simpler means than that disclosed by Matovich or other known prior art for driving and braking the reels and one which is less expensive, more compact, and more reliable.

SUMMARY OF THE INVENTION

The driving and braking coupling of this invention generally comprises a reversibly driven shaft having a helix thereon, the shaft and helix being capable of conducting braking and driving torque applied thereto through a drive disc threadably mounted for axial movement on the helix into engagement with spaced rotatably mounted driven wheels disposed on opposite sides of and frictionally engageable with the disc and preferably two wheels axially aligned with the shaft. Means are provided for reversing the direction of rotation of the helix to change the position of the disc to drive first one and then the other of the wheels, which, as shown, are pulleys to transfer the torque of another member such as the winding and unwinding reels of a tape recorder. When rotation of the helix is stopped the disc will move by its inertia along the helix from a drive position against one of the wheels to a braking position against the other of the two wheels. This being particularly true when the wheels are also joined by driving means such as a tape, film or other web or strip material.

The drive means for the recorder is preferably a reversible DC motor with the helix mounted on the output shaft thereof. This motor affords a suitable drive member and a dynamic brake for the helix; however, other drive systems could be utilized. The two rotatably mounted wheels or pulleys, axially aligned with the shaft, are capable of frictionally engaging the disc for drive and braking purposes. The disc is provided with a central opening and helical grooves providing a threadably movable mounting on the helix. The pulleys or wheels may be linked to the spool or reel-carrying spindles by drive belts or other connecting means so that rotation of one pulley causes rotation of one of the reels.

The coupling device of the present invention consists of a minimum of parts and therefore is compact, simple, and relatively inexpensive to manufacture and maintain.

Accordingly, an advantage afforded by the present invention is a relatively simplified, low-cost means for driving and braking a system of winding and unwinding reels. A single power source combined with the coupling disclosed by this invention provides a driving and braking torque to both reels. No complicated timing device, electromagnets or complex systems are utilized.

A further advantage of this invention resides in the fact that reliable means are incorporated for driving and braking the reels for tape recorders and the like so that the tape may be wound at substantially consistent winding tension, stopped, reversed, or wound at increased speed without spilling the tape or other deleterious effects.

Description of the drawings

The above and further advantages afforded by the present invention will become apparent to those skilled in the art after reading the following detailed description which refers to the accompanying drawing wherein.

Detailed description of the invention

Figure 1:
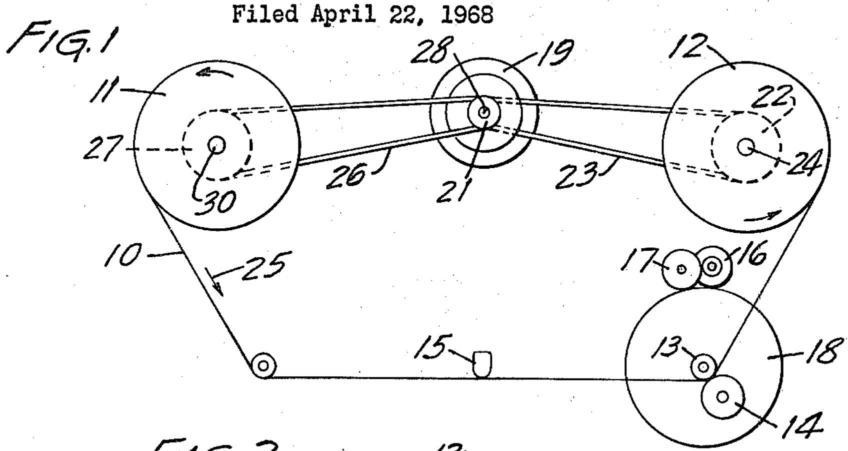
FIGURE 1 is a schematic plan view of a tape recorder incorporating the driving and braking system of the present invention.

Referring first to FIGURE 1, a tape 10 contained on the supply spool or unwinding reel 11 and the take-up spool or winding reel 12, is driven by a capstan 13. A spring-biased pressure roller 14 holds the tape in position against the drive capstan 13 so that the tape may be frictionally driven thereby at a constant speed along a predetermined path past the magnetic head 15. The capstan 13 is driven by the drive shaft of an electric motor 16 acting through an idler 17 and a flywheel 18. The winding reel 12 is driven by a reversible electric motor 19 acting through a pair of belt pulleys 21 and 22 and a belt 23. Pulley 22 is connected to reel 12 through a rotatable shaft or spindle 24. Reel 11, connected to pulley 27 through a rotatable shaft or spindle 30, is not being driven while the tape is moving in the direction indicated by the arrow 25, and it is freely rotatable about its axis with only the friction of a belt 26 and the pair of belt pulleys 27 and 28 retarding its rotation.

Figure 2:
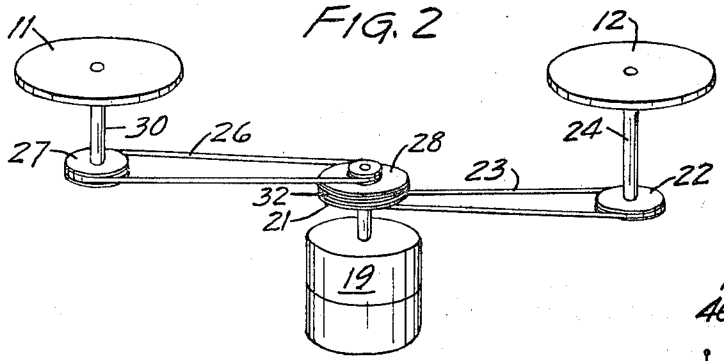
FIGURE 2 is a schematic perspective view illustrating the driving and braking system used in the tape recorder of FIGURE 1.
Figure 3:
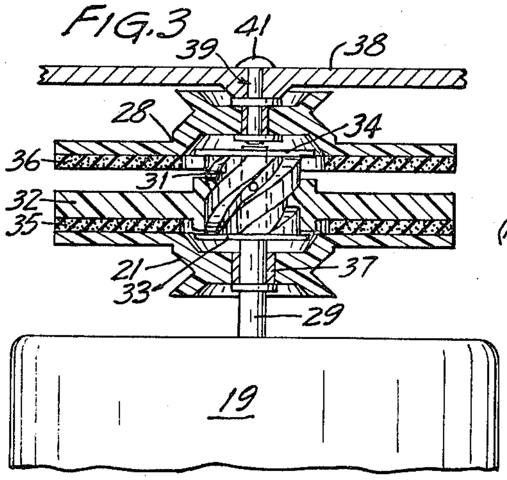
FIGURE 3 is an enlarged vertical sectional detail view through the coupling device shown in FIGURE 2.

For a more detailed description of the reel driving and braking mechanism, reference is made to FIGURES 2 and 3. The reversible motor 19 drives an output shaft 29 which has a cylindrical sleeve having a helical thread on its outer surface, hereinafter referred to as helix 31, fastened securely thereon for rotation therewith. A flat drive disc 32 having a threaded center opening is threadably mounted on the helix; the outer boundaries of its axial movement on the helix limited by washers 33 and 34. However, the disc has sufficient movement along the helix to frictionally engage the coated faces 35 and 36 of pulleys 21 and 28 respectively, with sufficient force to drive or brake same. The pulleys 21 and 28 are mounted to position the coated faces in spaced relation along the axis of the helix 31. Pulley 21 is mounted on the motor shaft 29 by means of a bearing 37 so that the pulley is freely rotatable on the shaft. Pulley 28 is rotatably mounted on a stationary frame mounting plate 38 by mounting means 39, comprising a pin 41 journalling the pulley for free rotatable movement about its axis which is aligned with the axis of the motor shaft 29. Both pulleys are mounted so as to permit frictional engagement between their respective coated surfaces 35 and 36 and the opposed corresponding side of disc 32 when the disc is at the appropriate axial position on the helix. For example, in FIGURE 3 the disc 32 is frictionally engaged with pulley 21 when it has traversed to its lower axial position on the helix. It, of course, will frictionally engage pulley 28 when it traverses to its upper axial position as visualized by viewing FIGURE 3.

If the helix 31 is manufactured with a right-hand thread, and the motor shaft 29 is turning counterclockwise, the disc 32 is urged downwards until it frictionally engages the lower pulley 21 and drives it and the belt-connected reel 12. The opposite pulley 28 is not engaged to the motor and will therefore permit its connected, unwinding reel 11 to coast. When the power to the motor is disconnected, the unwinding reel 11 and disc 32 will still be turning due to inertia and therefore the disc 32 will move upwards along the helix so that it frictionally engages pulley 28, which is connected to the unwinding reel 11. The unwinding reel is thereby effectively connected to the motor shaft and is abruptly decelerated by the motor. If heavier braking action is desired, with an A-C induction motor, direct current may be applied to the motor terminals, or in case of a D-C motor, shunting the motor terminals would increase the braking, affording dynamic braking of the motor due to generation of back electromotive force (EMF). When winding in the opposite direction, the action is completely reversed.

During play or record cycles the speed of rotation of the driving or winding reel is regulated by the tape speed, which in turn is controlled by the capstan and pressure roller. The tape between the capstan and the winding reel is therefore tensioned during these cycles because the winding reel's rotation speed is retarded by the inability of the tape to move any faster past the capstan and pressure roller. The inability of the winding reel to rotate faster therefore retards the speed of the driving motor 19; there is essentially no slippage between the winding reel and the motor shaft.

During rewind and fast-forward cycles, the tape speed is not limited by the capstan and pressure roller, and the winding reel's rotational speed is controlled only by the speed of the reel driving motor.

Figure 4:
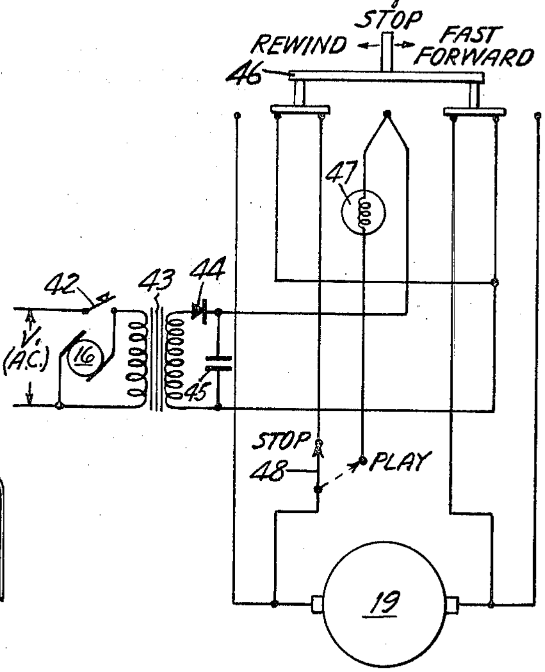
FIGURE 4 is a schematic diagram of the electrical circuitry to control actuation of the driving and braking system.

FIGURE 4 illustrates one electric circuit which may be used with the motors of FIGURE 1 to regulate the speed and direction of tape movement. A voltage, $V_1$, is applied across the ends of the circuit, which has a switch 42 permitting opening and closing of the circuit for turning the recorder on and off. The A-C motor 16, which drives the capstan as shown in FIGURE 1, is connected into the alternating current as indicated. A transformer 43, diode 44, and capacitor 45, act together to convert the alternating current to a substantially constant direct current which in turn is connected to a 3-position sliding switch 46. The 3-position switch arrangement permits the reversing and stopping of the D-C motor 19 which is used to drive the helix, disc and reels as illustrated in FIGURE 2. A voltage dropping resistor 47 and a single pole double switch 48 are connected in series, and switch 48 is thrown to the "play" position when the recorder is operated normally and switch 46 is not moved. The resistor 47 in the line places a low torque on the motor and permits its rotation to be retarded.

The helix 31, disc 32, and pulleys 21 and 28, may be constructed from any suitable material known in the art, for example, metal, plastic, or wood; but it is preferred to mold them from acetyl resins which permit manufacturing of the parts at an extremely low cost. Also, the acetyl resin molded parts are durable and have high wear resistance. A thin foam rubber material is preferred for providing surfaces 35 and 36 on the pulleys 21 and 28 which are frictionally engageable with the disc 32, because foam rubber essentially eliminates slippage between the disc and pulleys and because it is inexpensive and easy to apply. However, any appropriate material or coating which provides for frictionally engageable surfaces may be used. It will further be noted that the pulleys and disc may be manufactured from materials which are frictionally engageable without the application of any material or coating 35 and 36.

The rotational power source 19 is preferably a D-C motor because of its ease in reversing, compactness and simplicity, but any suitable power source may be utilized to control the rotation and stopping of shaft 29 in accordance with the invention.

Although the helix may have any suitable thread the preferred form, as illustrated, is a four lead helix with an acme thread having a helix angle of about 35 degrees.

The pulleys preferably are designed for belt drive which provide a quiet, efficient means of transmitting the rotational power; but any design which performs the necessary transmission function may be utilized, that is a gear or chain drive may be substituted for belts 26 and 23. Further, wheels or pulleys could be mounted for rim drive with disc 32 by placing their axis either parallel or normal to the axis of the disc and having axially spaced drive surfaces. The latter embodiment is disclosed in FIGURE 5 and described below.

Figure 5:
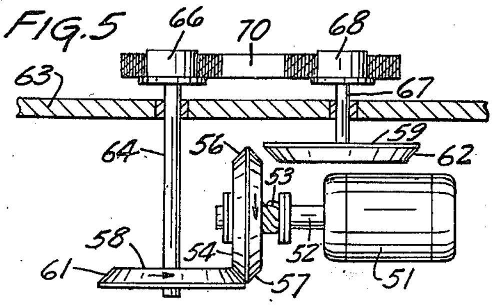
FIGURE 5 is a schematic detail view of a second embodiment formed in accordance with the present invention.

The embodiment of FIGURE 5 comprises a reversible drive motor 51 having a drive shaft 52 to which is secured a cylindrical collar having a helical thread, hereinafter referred to as helix 53. A drive disc 54 having a chamfered outer periphery defining two drive transmitting surfaces 56 and 57 and a threaded center opening is mounted on the helix 53 and movable axially therealong upon relative movement of the disc or helix. The helix will drive the disc 54 when axial movement of the disc is restrained by engagement with end washers supported by the helix 53 or shaft 52, or by engagement of the disc with either wheel of a pair of wheels 58 and 59. The wheels 58 and 59 have drive surfaces 61 and 62 respectively, frictionally engageable for driving engagement with the respective drive transmitting surfaces 56 and 57 on the disc 54. The wheels 58 and 59 are suitably supported to position the surfaces 61 and 62 in spaced relation along the axis of the helix 53. Wheel 58 may be suitably mounted and journalled on a frame member 63 by a shaft 64 adapted to carry on one end a reel or spool 66. Wheel 59 may be supported by a shaft 67, which shaft is rotatably journalled in the frame 63, which shaft is formed on the opposite end to suitably receive and drive a spool 68. Tape 70 or other strip material may be transported between the spools 66 and 68 upon rotation of the shaft 52. The direction of rotation of shaft 52 will determine which of the wheels 58 or 59 will be engaged and driven by the disc 54 in the same manner as discussed above with respect to the embodiment shown in FIGURES 1 through 4. When the tape movement is to be stopped the motor 51 is braked and the disc 54 will move from engagement with one wheel to braking engagement with the other wheel. The embodiment of FIGURE 5 illustrates a more direct drive from the motor to the spool or reel. The spools are driven in opposite directions by placing the drive surfaces on the wheels in axially spaced relation and the wheels in parallel planes on opposite sides of the axis of the helix as shown. If it is desired to alternately drive two shafts in the same direction upon reversing a drive motor, the wheels could be in the same plane and have drive surfaces axially spaced.

It is understood that the foregoing description of the accompanying figures of the drawing are intended to be illustrative of the invention, and are not intended to be limiting since alterations and/or modifications may be readily apparent to those skilled in the art.

What is claimed is:

1. In a web transport mechanism for moving a wound web from a first spool to a second spool and for stopping said web without spillage, the combination of:

(a) a helix mounted for rotation on a shaft, (b) a pair of wheels individually mounted for rotation about their axes and positioned adjacent opposing ends of the helix, (c) means for connecting each of said wheels to a spool, (d) a disc threadably mounted coaxially on said helix and movable axially along the helix, upon relative rotational movement of said disc and helix, to move said disc into frictional driving engagement with one of said wheels upon rotation of said helix to rotate said one wheel and to move said disc into frictional braking engagement with the other of said wheels when the rotation of the helix is stopped, (e) a direct current electric motor connected directly to said shaft and said helix for controlling rotation of said shaft and helix, and (f) means connected to said motor to drive and afford braking action on said motor.

2. The combination of claim 1 wherein said means connected to said motor comprises switch means for changing the direction of rotation of said motor and for shunting said motor.

3. The combination of claim 1 wherein said pair of wheels are mounted coaxially with and on opposite sides of said disc.

4. The combination of claim 1 wherein said pair of wheels are mounted on parallel axes normal to the axis of said helix with said wheels positioned on opposite sides of the axis of said helix.

5. The combination of claim 3 wherein the face of said wheels in opposed relationship to said disc are coated with a friction material.

6. A device for driving and braking a system of reels for winding and unwinding a tape especially for use in connection with recording devices comprising:

(a) a shaft mounted for rotation in a first and second direction;

(b) a helix mounted on the shaft for rotation therewith;

(c) a first wheel mounted for free rotation at one end of and coaxially with the helix;

(d) a first rotatable reel winding means operably connected to the first wheel;

(e) a second wheel mounted for free rotation at the other end of and coaxially with the helix;

(f) a second rotatable reel winding means operably connected to the second wheel;

(g) a disc threadably mounted on said helix and movable axially along the helix and engageable with said first and second wheel; and (h) drive means for rotating said shaft in one direction and in the opposite direction and for braking said shaft, whereby:

(1) the disc is axially movable along the helix into frictional driving engagement with said first wheel to rotate same and said first rotatable reel winding means by rotation of the helix and shaft in said one direction, said second wheel and said second reel winding means being free of frictional driving engagement of said disc, (2) the disc is further axially movable along the helix into frictional driving engagement with said second wheel to rotate same and said second reel winding means by rotation of the helix and shaft in said opposite direction, said first wheel and said first reel winding means being free of frictional driving engagement of said disc, (3) the disc is further axially movable along the helix from frictional driving engagement with the first wheel to frictional braking engagement with the second wheel when rotation of the helix and shaft is stopped to urge said second wheel and said second reel winding means against rotation by frictionally connecting said stopped helix to said second wheel through said disc which second reel is the unwinding reel, and (4) the disc is further axially movable along the helix from frictional driving engagement with the second wheel to frictional braking engagement with the first wheel when rotation of the helix and shaft is stopped to urge said first wheel and said first reel winding means against rotation by frictionally connecting said stopped helix to said first wheel through said disc, to then brake the first reel which would be the unwinding reel to avoid spillage of the tape, such that in all instances the unwinding reel is braked first and the winding reel is braked through the tape.

References Cited

UNITED STATES PATENTS

| | | | |
|---|---|---|---|
| 2,675,974 | 4/1954 | Jones | 242—55.12 |

FOREIGN PATENTS

| | | |
|---|---|---|
| 822,446 | 11/1951 | Germany. |
| 1,110,976 | 4/1968 | Great Britain. |

LEONARD D. CHRISTIAN, Primary Examiner